United States Patent
Stoyan

[11] Patent Number: 6,010,219
[45] Date of Patent: *Jan. 4, 2000

[54] FENESTRATED CONTACT LENS FOR TREATING MYOPIA

[75] Inventor: Nick Stoyan, Encino, Calif.

[73] Assignee: Contex, Inc., Sherman Oaks, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,355

[22] Filed: Jun. 28, 1996

[51] Int. Cl.⁷ .................................................. G02C 7/04
[52] U.S. Cl. ...................................... 351/160 R; 351/177
[58] Field of Search ........................ 351/160 R, 160 H, 351/161, 162, 177

[56] References Cited

U.S. PATENT DOCUMENTS

| | | | |
|---|---|---|---|
| 3,246,941 | 4/1966 | Moss | 351/160 R |
| 3,833,786 | 9/1974 | Brucker | 351/160 R |
| 3,971,910 | 7/1976 | Marschalko et al. | 219/121 |
| 4,068,933 | 1/1978 | Saiderman | 351/160 R |
| 4,952,045 | 8/1990 | Stoyan | 351/160 |
| 5,191,365 | 3/1993 | Stoyan | 351/160 |
| 5,270,051 | 12/1993 | Harris | 424/427 |
| 5,349,395 | 9/1994 | Stoyan | 351/161 |
| 5,428,412 | 6/1995 | Stoyan | 351/177 |
| 5,517,260 | 5/1996 | Glady et al. | 351/169 |

FOREIGN PATENT DOCUMENTS

WO 97/19381  5/1997  WIPO .

*Primary Examiner*—Scott J. Sugarman
*Attorney, Agent, or Firm*—Oppenheimer Wolff & Donnelly LLP

[57] ABSTRACT

An improved corneal contact lens for use in orthokeratology wherein the lens has an anterior surface, posterior surface and includes a tear zone which defines a tear reservoir located on the posterior surface of the lens. The improvement involves providing at least one fenestration surface located in the tear zone which defines an opening extending through the contact lens from the anterior surface to the posterior surface. The openings in the tear zone relieve fluid pressure which was found to cause certain symptoms, such as lens adhesion, tightening and general wearing discomfort. The fenestrations in the tear zone provide enhanced wearing comfort without adversely affecting the cornea-shaping properties of the lens.

7 Claims, 1 Drawing Sheet

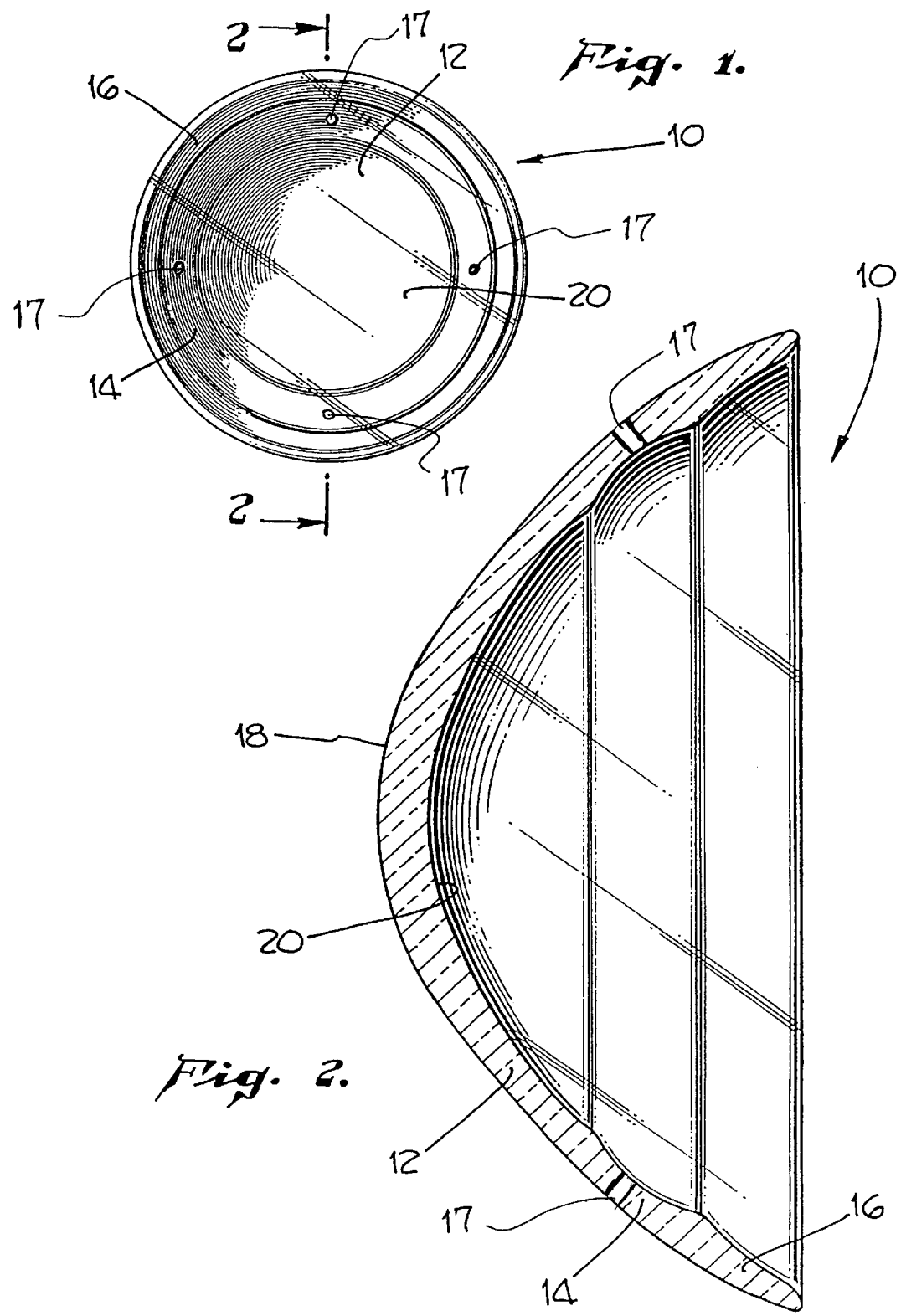

FENESTRATED CONTACT LENS FOR TREATING MYOPIA

BACKGROUND OF THE INVENTION

1. Field of the Invention

The present invention relates generally to corneal contact lenses and their use in treating myopia. More particularly, the present invention is directed to corneal contact lenses which are shaped to provide gradual altering of the patients's cornea during continued wear to reshape the cornea to reduce the myopic condition.

2. Description of Related Art

Myopia, also known as nearsightedness, is a condition where the radius of curvature of the cornea is smaller than normal. Individuals with this condition have difficulty in focusing on distant objects because the cornea is curved too sharply to provide adequate focusing. Myopia is a common condition for which no entirely suitable permanent treatment has been developed.

One approach to correcting myopia is through surgical reshaping of the cornea. However, such surgical procedures have not been entirely proven and there is some question as to the permanency of the surgically altered lens shape.

Another approach is to alter the corneal shape by wearing corneal contact lenses which are designed to continually exert pressure on selected locations of the cornea to gradually force or mold the cornea into the desired normal corneal curvature. A retainer lens is then worn on a part time basis to prevent the cornea from returning to its original shape. This method of treatment is commonly referred to as orthokeratology. The success of any treatment by orthokeratology is dependent upon the shape and structure of the corneal contact lens.

My prior U.S. Pat. Nos. 4,952,045; 5,191,365; 5,349,395; and U.S Pat. No. 5,428,412 disclose corneal contact lenses which are examples of the types of lenses which have been designed for use in treating myopia. The lenses typically include a central zone, a tear zone located concentrically around the central zone and an outer peripheral zone which is located concentrically around the tear zone. This lens design provides a radius of curvature in the tear zone which is sharper than the radius of curvature for both the central zone and peripheral zones. This particular type of multi-curve corneal contact lens configuration is useful in changing the shape of the myopic cornea to that of a normally shaped cornea. In addition, the steeper curve of the tear zone provides a ring shaped area where fluid is concentrated between the lens and cornea. As the contact lens reshapes the cornea, the central portion of the cornea flattens and forces the para-central cornea to flow into the tear zone. As reshaping of the cornea occurs, a new flatter contact lens is re-fit. In most cases, if a flatter contact lens is not fit the lens may tighten and possibly adhere to the cornea.

Although the corneal contact lens of the type disclosed in my prior patents are well suited for their, intended purpose, there is continual need for improvement of the design of such lenses to make them better suited for use in treating myopia.

SUMMARY OF THE INVENTION

In many situations myopic patients experience discomfort and eventual lens adhesion due to positive changes in the shape of the cornea which occur during orthokeratology. These changes in cornea shape create various areas of pressure between the lens posterior surface and the cornea which eventually become sufficiently uncomfortable to require a change in fit of the lens.

In accordance with the present invention, a corneal contact lens for treating myopia is disclosed wherein the lens is designed to increase the comfort with which the lens is worn by the patient. The lens is designed to reduce certain symptoms such as lens adhesion, pressure and tightening as well as to reduce the number of contact lenses needed to complete the orthokeratology procedure.

Lenses in accordance with the present invention are an improvement upon the type of lenses disclosed in U.S. Pat. Nos. 4,952,045; 5,191,365; 5,349,395; and U.S. Pat. No. 5,428,412. The lenses include a central zone having a central zone radius of curvature, a tear zone located concentrically around the central zone wherein the tear zone radius of curvature is smaller than the central zone radius of curvature. As a feature of the present invention, at least one fenestration surface is located in the tear zone which provides an opening extending through the contact lens from the anterior surface of the lens to the posterior surface. The opening provides release of pressure which may buildup between the posterior surface of the lens and the cornea. It was discovered that the release of pressure provided by the openings in the tear zone reduced undesirable symptoms, such as lens adhesion, pressure buildup and tightening of the lens without reducing the effectiveness of the lens with regards to reshaping the cornea as part of the orthokeratology procedures.

The corneal contact lens, in accordance with the present invention, further includes a peripheral zone located concentrically around the tear zone. The radius of curvature for the peripheral zone is greater than, equal to or steeper than the radius of curvature for the central zone. As a feature of the present invention, the pressure relief openings located in the tear zone may be used in connection with both spheric and aspheric lenses.

The above described and many other features and attendant advantages of the present invention will become better understood by reference to the following detailed description when taken in conjunction with the accompanying drawings.

BRIEF DESCRIPTION OF THE DRAWINGS

FIG. 1 is a rear view of a preferred exemplary corneal contact lens in accordance with the present invention.

FIG. 2 is a sectional view of a preferred exemplary corneal contact lens in accordance with the present invention.

DETAILED DESCRIPTION OF THE PREFERRED EXEMPLARY EMBODIMENTS

The present invention is an improvement upon my prior U.S. Pat. No 4,952,045; 5,349,395; 5,191,365; and U.S. Pat. No. 5,428,412. The contents of my prior patents are hereby incorporated by reference.

The improvement of the present invention, involving locating pressure relief holes in the tear zone of a multi curve orthokeratology lens, has wide application not only to the lenses disclosed in my prior patents, but also is applicable to any multi-curve lens wherein a steeper curve area, i.e. a tear zone, creates a tear reservoir which may produce a buildup in fluid pressure between the posterior surface of the lens and the cornea. Although the present invention will be described in connection with preferred exemplary embodiments, as set forth below, it will be understood by those skilled in the art that the present invention has wide application to those situations where pressure relief between the posterior surface and cornea is required or desirable. The invention is particularly well-suited for use with multi-curved contact lenses where localized pressure buildup between the lens tear zone and cornea may become a problem.

A preferred exemplary corneal contact lens in accordance with the present invention is shown generally at 10 in FIGS. 1 and 2. The lens 10 includes a central portion or zone 12, a tear portion or zone 14 and a peripheral portion or zone 16. The overall dimensions of the lens 10 are within the normal ranges for corneal contact lenses. The outside diameter of the lens is typically between about 5 to 20 millimeters with other diameters being possible in special cases. In general most lenses will have overall diameters in the neighborhood of 10 millimeters. The lens has a lateral or cross-sectional thickness of between about 0.05 millimeters to 1.0 millimeters. Thicknesses in the range of 0.05 to 0.5 millimeters are preferred.

The lens has an anterior surface 18 which is shaped in the same manner as conventional contact lenses. The posterior surface 20 is shaped to provide the central zone 12, tear zone 14 and peripheral zone 16 as will be described in detail below. The lateral thickness of the lens 10 will vary since the anterior surface curves 18 do not have to match the various curves of the posterior surface 20. The lateral thickness of the lens depends upon a number of factors including the corrective prescription of the lens and the overall diameter.

The curve of the posterior surface 20 in the central zone 12 may be spherical or aspheric. In one embodiment, the posterior surface of the central zone 12 is aspheric and has a radius of curvature which gradually increases from a minimum of 4 millimeters to a maximum of 20 millimeters as one moves from the center of the central zone 12 to the perimeter of the central zone. In this embodiment, the aspheric curve provides multiple focusing of light as it passes through the lens and into the wearers eye. The eccentricity of the aspheric curve is between −1.5 to 1.5. Eccentricities on the order of about 1.0 or −1.0 are preferred. If the central zone of the lens is aspheric as shown in the embodiment of FIG. 2 it provides multiple focal points. In addition, the aspheric central zone has a diameter which is maximized to enhance the correction of vision provided by the multiple focal points. Diameters on the order of about 6 to 20 millimeters are preferred with 7 to 10 millimeters being most preferred.

The posterior surface of the central zone 12 if spherical has a radius of curvature of between about 4 millimeters to 20 millimeters. The diameter of the spherical central zone is between about 2–12 millimeters. Preferred ranges for the spherical radius of curvature and diameter are 7 to 10 millimeters and 4 to 8 millimeters respectively. The anterior surface of the central spherical or aspheric zone 12 has a radius of curvature which may or may not match the radius of the posterior 20, i.e. the anterior surface may be spherical or aspheric if desired.

The tear zone 14 forms a ring around the central optical zone 12 and is integral therewith. The chord length of the tear or intermediate zone 14 is between about 0.1 to 5 millimeters. The radius of curvature of the tear zone 14 is between about 0.1 to 12 millimeters. The preferred ranges are from 0.2 to 3 millimeters for the chord length and 4 to 10 millimeters for the radius of curvature. The tear zone may have a spherical radius of curvature or may have an aspheric radius of curvature whereby the radius changes progressively (either increasing or decreasing) along the radial direction of the tear zone. As disclosed in detail in my prior U.S. Pat. No. 4,952,045, an important feature is that the radius of curvature of the intermediate tear zone 14 must be smaller than the radius of curvature for the central optical zone 12. This creates a zone of increased curvature around the central zone 12 which provides desirable reshaping of the cornea. In addition, a circular tear channel or duct is formed between the tear zone 14 and the eye to provide a concentrated circular reservoir of tear fluid which helps position the lens carefully on the cornea and enhances lens wearing comfort. Preferably, the radius of curvature of the tear zone will be between 0.10 millimeter and 2.0 millimeters less than the smallest radius of curvature of the central zone 12.

The tear zone is the preferred location of the fenestrations in accordance with the present invention. As many as 100 fenestrations may be used with the sizes varying from 0.0001 mm to the complete width of the tear zone (i.e. 5 mm). The spacing of the fenestrations may be symmetric or done at random. A series of four fenestrations is preferred with the diameter of each being 0.001 mm in size. It is preferred that the fenestrations be equally spaced for optimum release of pressure. In FIGS. 1 and 2, the four preferred fenestrations are shown at 17. The fenestrations are preferably circular holes. However, they may be any shape desired provided that they provide fluid communication and pressure release between the anterior and posterior surfaces of the lens.

The peripheral zone 16 is integral with the remainder of the lens in that it is preferably machined or molded from the same piece of polymer material. The peripheral zone 16 has a radius of curvature of between about 4 to 25 millimeters. The radius of curvature may be spheric or aspheric. Eccentricities on the order of about −2.5 to 2.5 are preferred. The chord length of the ring defined by the peripheral zone 16 is between about 0.1 to 3 millimeters. The preferred ranges are 4 to 25 millimeters for the radius of curvature and 0.1 to 3.0 millimeter for the chord length.

The posterior surface of the peripheral zone 16 may have a single radius of curvature, may be divided into a plurality of smaller peripheral curves or it can be aspheric. The radii of curvature of the plurality of peripheral curves may be gradually increased from the radially outermost curve. Preferably, the innermost peripheral curve will have a radius of curvature slightly above the radius of curvature for the intermediate tear zone 14. The outermost peripheral curve will have the largest radius of curvature.

The chord length or zone width for each of the peripheral curves is preferably between about 0.05 millimeter and 0.1 millimeter. The number of peripheral curves present can be varied in the peripheral zone 16 if desired. In addition, the chord length of each of the peripheral curves may be varied. Alternatively, the innermost peripheral curve and outermost peripheral curve may have chord lengths which are longer than the peripheral curves located therebetween. It is preferred that the posterior peripheral zone be a continuous aspheric radius of curvature in which the radius of curvature gradually increases towards the outer radial edge of the lens.

The lens 10 can be made according to any of the known machining or molding processes which allow aspheric or spherical curvature lenses to be formed. The preferred procedure is to machine the lens from buttons or disks as is commonly known. The materials used in making the lens 10 can be any of the conventional polymers used in oxygen permeable hard, semi-hard and soft hydrogel corneal contact lenses. If desired the three zones 12, 14 and 16 can be made from the same lens material or different lens materials. For example, a suitable lens 10 could include a hard plastic central zone 12 and peripheral zone 16 while having a semi-hard or soft tear zone 14. Another example for a suitable lens could include a hard plastic central zone 12 and tear zone 14 while having a semi-hard or soft peripheral zone 16. Additional control over corneal reshaping or molding is provided by this ability to vary the hardness of the individual zones. The lens may also be used in conjunction with enzyme orthokeratology to speed up the process and enhance the results of the elimination of refractive error in the myopic cornea. The enzyme may be injected or used topically. Any known cornea softening enzyme may be used. The lens configuration could enhance the enzyme orthokeratology procedure as it will mold the cornea to a desired shape more rapidly than a standard lens. (See U.S. Pat. No. 5,270,051.)

In accordance with one way of making the fenestration, a standard precision drill may be used. However any technique of creating the fenestrations may be used. Some of the known ways are a laser, (single beam or diffused beam) CNC lathes, hand drills, manual lathes and precision drills. Any type of drill bit may be used as well as a drill bit/countersink combination. An apparatus for making laser fenestrations is described in U.S. Pat. No. 3,971,910. The fenestrations may be added to the lens at any stage of the manufacturing procedure but it is preferred that they be done on a finished lens.

In accordance with a preferred manufacturing technique, the finished lens should remain mounted to the arbor on which the anterior surface of the lens was machined. The arbor is placed into a collet on a precision drill lathe at a known point and then indexed out from center to the desired point of machining. The depth of the machining must exceed the lateral thickness of the lens as to penetrate completely. This depth is a known point. Once the drilling is completed the fenestrations may or may not be countersunk. The countersinking is typically done by hand, but may be machined as well. It is necessary that the posterior surface of the fenestration be countersunk and, if so desired, the anterior surface. Any type of countersink tool may be used. Once the countersink is completed, the fenestration should be polished. There are many ways of polishing the fenestration. One preferred way of polishing is to insert a polish coated thread through the fenestration. The thread is stroked back and forth while rotating the lens. Then, using any type of blending tool with polish, both the concave and convex surfaces of the lens surrounding the fenestrations are polished. Magnified inspection of the fenestrations should be carried out to assure the lens is not fractured and that the fenestrations are smooth.

As an example, a preferred exemplary lens has an overall diameter of 9.6 millimeters. The central zone has a diameter of 6 millimeters. The radius of curvature for the posterior central zone is 8.00 millimeters. The posterior tear zone width or chord length is 1.2 millimeters wide and the radius of curvature is aspheric based on the posterior central zone radius of curvature. Four fenestrations are located 90 degrees apart from each other at along a diameter of 7.2 mm. At the beginning of the tear zone the radius of curvature is equal to the central zone radius. At the end of the tear zone the radius of curvature is 0.6 millimeters less than the central zone radius of curvature. The posterior peripheral zone width is 0.6 millimeters wide and the radius of curvature is aspheric and based on the posterior central zone radius. The peripheral zone radius of curvature starts equal to the smallest radius in the tear zone and increases up to 6 millimeters larger than the central zone radius.

The preferred exemplary lenses described above may be used in any of the known orthokeratology procedures. The addition of fenestrations, in accordance with the present invention, was found to enhance the wearing comfort of the lenses without adversely affecting the ability of the lens to reshape the cornea as part of the orthokeratology procedure.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A corneal contact lens adapted for use in orthokeratology, said contact lens comprising:

a lens body having a posterior surface which is located adjacent to the surface of a patient's eye and an anterior surface, said lens body comprising:

a central zone of said posterior surface having a central zone radius of curvature;

a tear zone of said posterior surface which is located concentrically around said central zone, said tear zone being integral with said central zone and having a tear zone radius of curvature wherein said tear zone radius of curvature is smaller than said central zone radius of curvature to provide a tear reservoir located between the tear zone and the surface of the eye;

one or more fenestration surfaces located only in said tear zone, said fenestration surfaces defining openings extending through said lens body from the tear zone of said posterior surface to the anterior surface of said lens body to thereby provide a passageway for fluid through said lens body to alleviate fluid pressure which may build up in said tear reservoir, said passageway having a posterior end at the tear zone of said posterior surface which is displaced away from the surface of said patient's eye and separated therefrom by said tear reservoir; and a peripheral zone of said posterior surface which is located concentrically around said tear zone, said peripheral zone being integral with said tear zone and having a peripheral zone radius of curvature wherein said peripheral zone radius of curvature is greater than, equal to or smaller than said central zone radius of curvature.

2. A corneal contact lens according to claim 1 wherein the radius of curvatures for at least one of said central zone, tear zone or peripheral zone is aspheric.

3. A corneal contact lens according to claim 2 wherein the radius of curvatures of said central zone, tear zone and peripheral zone are aspheric.

4. A corneal contact lens according to claim 1 wherein there are four fenestration surfaces which define openings extending through said contact lens from the tear zone of said posterior surface to said anterior surface.

5. A corneal contact lens according to claim 4 wherein said four fenestration surfaces are located circularly equidistant from each other in the tear zone of said posterior surface.

6. A corneal contact lens according to claim 1 wherein said fenestration surface is a surface defining an opening having a size of between 0.0001 mm to 2 mm.

7. A corneal contact lens according to claim 6 wherein said opening is circular and has a diameter of about 0.001 mm.

* * * * *